J. HARKER.
MANURE SPREADER.
APPLICATION FILED SEPT. 22, 1910.
998,769.
Patented July 25, 1911.
3 SHEETS—SHEET 3.
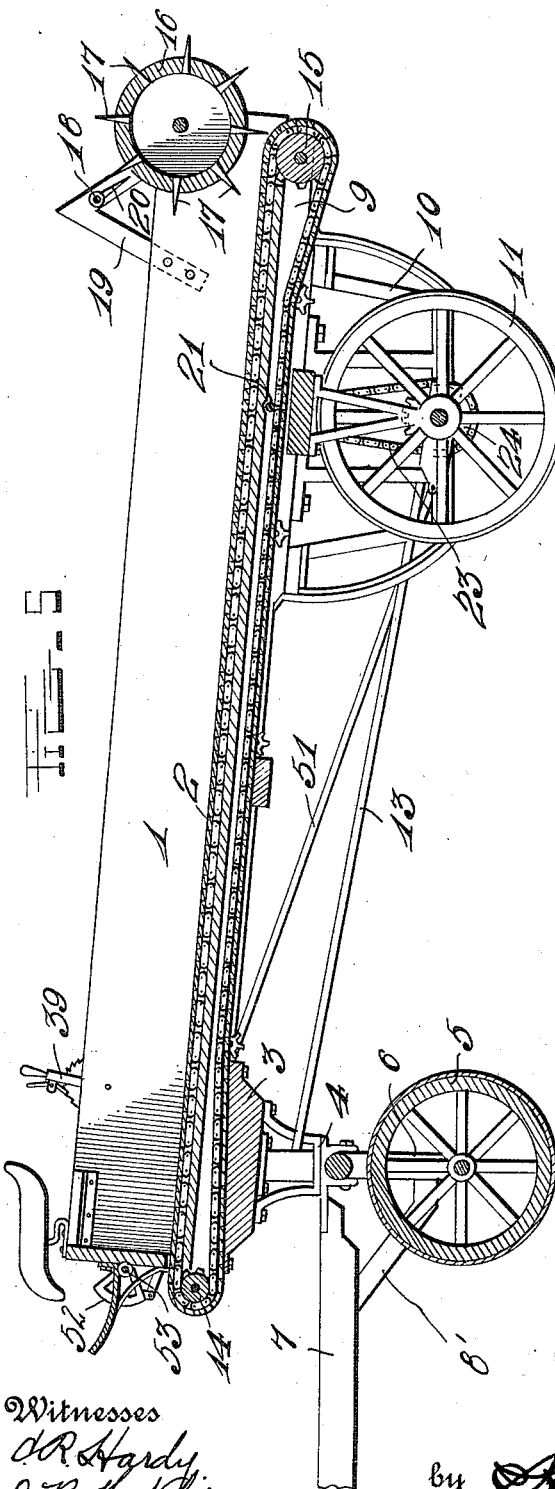
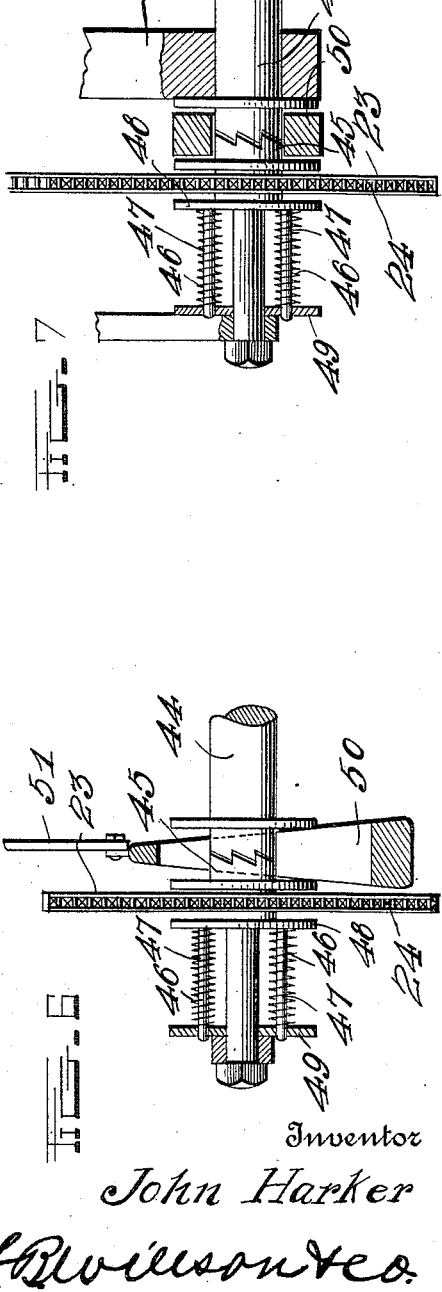
Witnesses
J. R. Hardy
O. B. Hopkins
Inventor
John Harker
by H. B. Willson & Co.
Attorneys

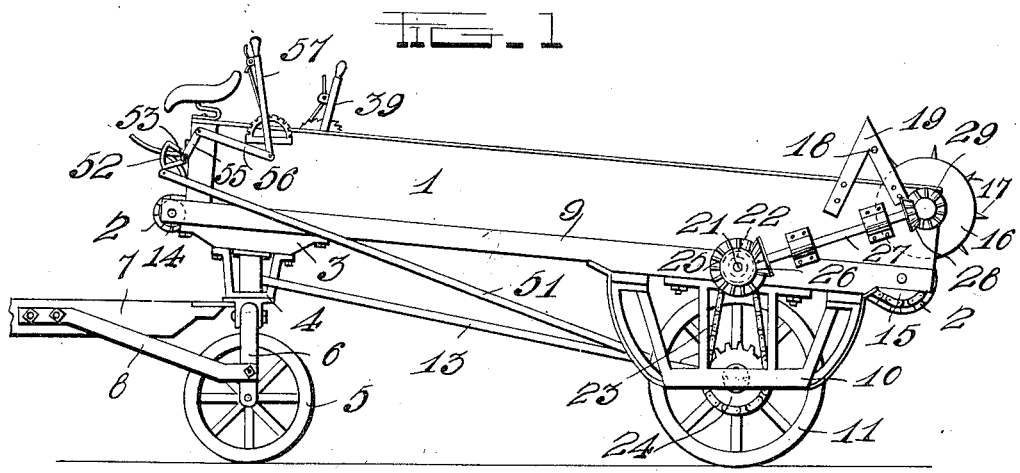
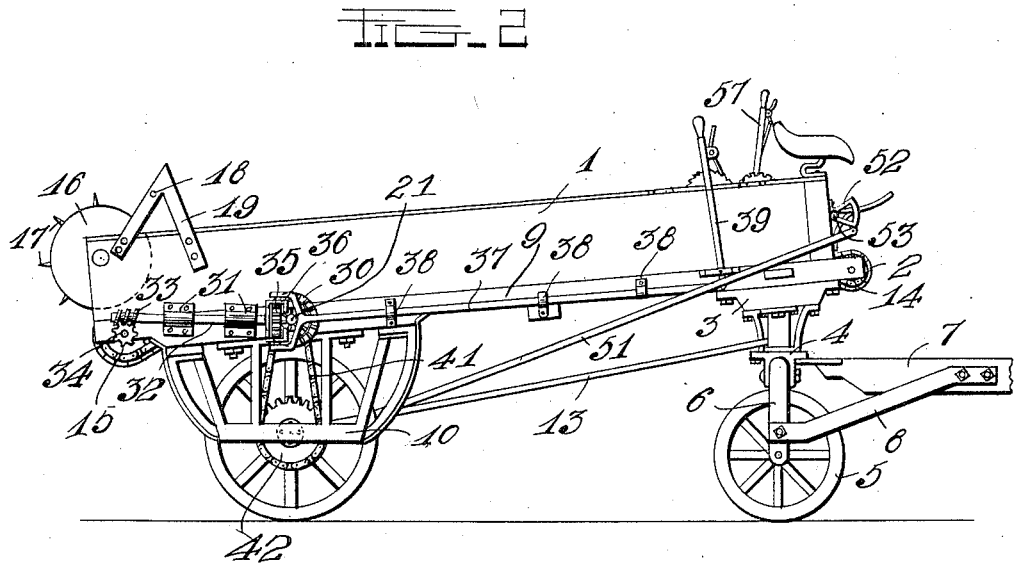

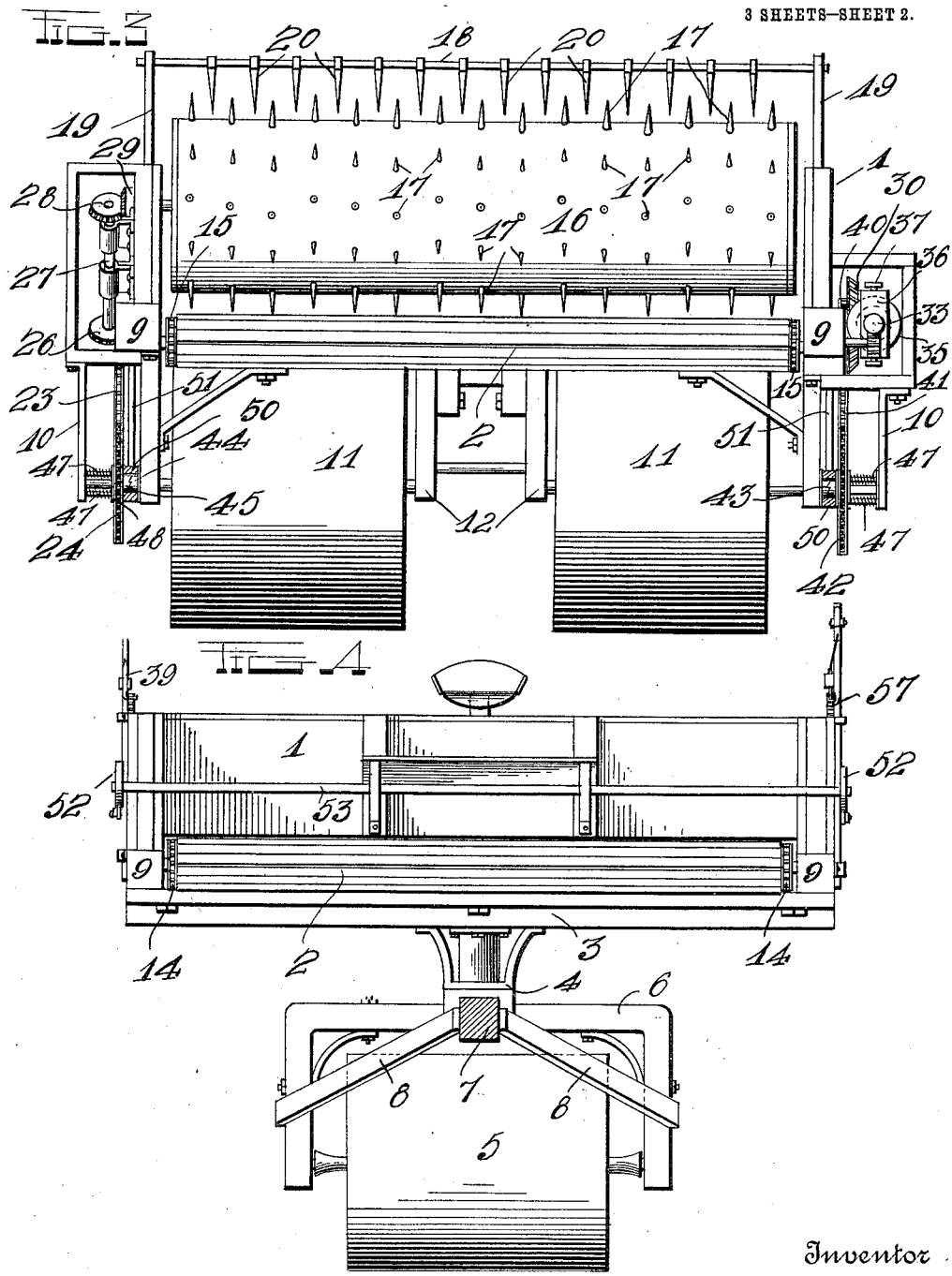

UNITED STATES PATENT OFFICE.

JOHN HARKER, OF KENDALLVILLE, INDIANA.

MANURE-SPREADER.

998,769. Specification of Letters Patent. Patented July 25, 1911.

Application filed September 22, 1910. Serial No. 583,195.

*To all whom it may concern:*

Be it known that I, JOHN HARKER, a citizen of the United States, residing at Kendallville, in the county of Noble and State of Indiana, have invented certain new and useful Improvements in Manure-Spreaders; and I do declare the following to be a full, clear, and exact description of the invention, such as will enable others skilled in the art to which it appertains to make and use the same.

This invention relates to improvements in manure spreaders.

One object of the invention is to provide an improved construction of manure spreader having means whereby the ground will be rolled and evenly packed before the manure is applied thereto and whereby the ground will not be cut up or have wheel ruts formed therein as occurs in the use of the usual forms of manure spreader.

Another object is to provide a machine of this character having an improved construction of discharging mechanism and means whereby the same may be regulated to discharge the desired quantity of manure to an acre.

With these and other objects in view, the invention consists of certain novel features of construction, combination and arrangement of parts as will be more fully described and particularly pointed out in the appended claim.

In the accompanying drawings: Figure 1 is a side view of one side of the machine; Fig. 2 is a similar view of the opposite side; Fig. 3 is an end view of the rear end of the machine; Fig. 4 is a similar view of the front end; Fig. 5 is a vertical longitudinal sectional view; Fig. 6 is a detail horizontal sectional view through the rear supporting and driving mechanism showing the means whereby the discharging mechanism is drawn into and out of gear; Fig. 7 is a vertical cross sectional view through the rear portion of the machine taken on a line with the shafts of the rear rollers and main drive shaft of the discharging mechanism.

Referring more particularly to the drawings, 1 denotes the body of the spreader which may be of any suitable size and which is provided with an endless conveyer bottom 2 hereinafter described. To the lower side or front end of the body 1 is secured a front bolster 3 to which is connected the upper member of the fifth wheel connection 4 of the front supporting roller 5. The lower member of the fifth wheel connection is secured to the fork or frame 6 of the roller and to said frame is also connected the inner end of a draft tongue 7. The tongue is also preferably connected to the frame 6 by inclined brace bars 8 as shown. The bottom of the body is provided at its opposite sides with sills 9 to which are secured downwardly projecting bearing brackets 10 which form the outer bearings for the rear supporting rollers 11 of the machine. The inner bearings for the rollers 11 are formed by depending brackets or hangers 12 secured to the frame of the body as shown. The front roller supporting mechanism and the rear roller supporting mechanism are connected together and braced by a central longitudinally extending reach rod 13. By providing the supporting rollers 5 and 11 the ground will be rolled and packed and all ruts or uneven places covered or rolled out so that the manure when discharged from the wagon will be uniformly spread over the surface of the ground.

The endless conveyer bottom 2 of the spreader may be of any suitable construction and at the front end of the body, said conveyer bottom passes around a front supporting roller or pulley 14 and at the rear end of the body the conveyer passes around a drive pulley or roller 15 whereby the upper stretch of the conveyer and the load carried thereby is moved toward the discharging mechanism at the rear end of the machine. The discharging mechanism comprises a cylinder 16 which is revolubly mounted in the open rear end of the machine and is provided with a series of radially projecting distributing teeth 17 which catch the manure as it is forced by the conveyer into engagement with the cylinder and when the cylinder is turned will throw the manure out or discharge the same from the rear end of the machine.

In order to break or tear the manure up into small pieces before being distributed, I provide a transversely disposed bar 18 which is supported at its opposite ends in suitable brackets 19 secured to the opposite side of the body 1 as shown. The bar 18 is provided with a series of depending teeth 20 one of which is disposed between each two teeth of the discharging cylinder 16 whereby when the manure is brought around by the teeth of the cylinder the large pieces thereof will be caught by the teeth 20 which will, together with the teeth 17 of the cylinder break up the manure into suitable sizes for even distribution over the ground.

In order to drive the endless conveyer of the machine and the distributing cylinder, I provide a suitable operating mechanism comprising a main drive shaft 21 which is revolubly mounted in the sills of the body preferably above and in line with the axles of the rear supporting rollers 11. On one end of the shaft adjacent to one side of the body 1 is fixedly mounted a sprocket gear 22 which is connected by a sprocket chain 23 to a sprocket gear 24 loosely mounted on the outer portion of the axle of one of the rollers 11 whereby the movement of said roller will be imparted to the shaft 21 for the purpose of operating the same. On the end of the shaft 21 adjacent the sprocket gear 22 is fixedly mounted a bevel gear wheel 25 with which is operatively engaged a bevel gear pinion 26 fixed on the lower end of an inclined rearwardly extending cylinder driving shaft 27 which is revolubly mounted in suitable bearings arranged on the adjacent side of the body as shown. On the opposite or outer end of the shaft 27 is fixedly mounted a bevel gear pinion 28 which is adapted to engage a similar pinion 29 formed on the adjacent end of the cylinder shaft as shown. By thus constructing and arranging the driving mechanism for the cylinder the latter will be operated at the required speed to feed the manure from the machine. On the opposite end of the shaft 21 is fixedly mounted a graduated gear 30 which has formed thereon annular series of toothed surfaces of different diameters whereby different speeds may be obtained from said gear. Revolubly mounted in suitable bearings 31, secured to the side of the body 1 adjacent the gear 30, is a power transmitting shaft 32 on the outer end of which is arranged a worm 33 which is operatively engaged with a worm gear 34 mounted on the outer end of the shaft of the rear conveyer roller 15 whereby the movement of the shaft 21 is communicated to the shaft of the roller 15 to drive the same in the proper direction for operating the conveyer. On the inner end of the shaft 32 is slidably keyed a gear pinion 35 which is adapted to be engaged with the various series of teeth on the gear 30 whereby the shaft 32 may be driven at different speeds.

The gear 35 is adapted to be shifted back and forth on the end of the shaft 32 to bring said gear into engagement with one or the other of the annular series of teeth on the gear 30 by means of a shifting mechanism comprising a rectangular frame 36 which is arranged around the gear 35 and slides on the shaft 32. To the frame 36 is connected the bifurcated rear end of a shifting rod or bar 37 which is slidably mounted in suitable guides 38 on the side of the body and is connected at its forward end with a shifting lever 39 pivotally mounted on the side of the body in convenient reach of the driver. The lever 39 is provided with a suitable pawl and ratchet locking mechanism whereby the same may be fastened to hold the gear 35 in its adjusted position. On the shaft 21 adjacent the gear 30 is fixed a sprocket gear pinion 40 which is connected by a sprocket chain 41 to a sprocket gear 42 on the shaft of the adjacent rear roller 11 whereby the motion of this roller is imparted to the main drive shaft 21.

The sprocket gears 24 and 42 are loosely mounted on the shafts of the rear rollers 11 and are operatively connected thereto by means of clutch devices 43, one member 44 of which is fixedly mounted on the shaft, while the opposite member 45 thereof is fixed on or forms a part of the sprocket gears. The gears 24 and 42 are normally held in engagement with the clutch members 44 on the shafts of the rollers by a series of coiled springs 46 which are arranged between the outer sides of the sprocket wheels and the inner sides of the outer members of the bearing brackets 10 for said roller shaft. The springs 46 are arranged on and supported by rods 47 which are secured at one end to an inner supporting plate 48 and slidably engaged at their outer ends with apertures formed in an outer supporting plate 49 as shown.

In order to disengage the gears 24 and 42 from the clutch members on the shaft, I provide a suitable gear shifting mechanism which as here shown preferably comprises a pair of slotted wedge shaped steel blocks 50 secured to the rear ends of shifting bars 51, the forward ends of which are connected to rocker arms 52 fixedly secured to the opposite ends of a rock shaft 53 which is arranged across and journaled in suitable bearings on the front end of the machine. The shaft 53 is provided with a crank arm 55 which is connected by a link 56 to an operating lever 57 whereby said shaft is rocked.

When the shaft is rocked in one direction the clutch shifting blocks will be drawn forwardly thereby disengaging said clutch members and throwing the operating mechanism out of gear. When the shaft is rocked in the opposite direction the blocks will be retracted thereby permitting the springs 46 to throw said clutch members into operative engagement. The lever 57 is provided with a pawl and ratchet locking mechanism whereby the rock shaft and clutch shifting blocks are held in their adjusted positions.

The upper stretch of the endless conveyer which forms the bottom of the machine is slidably supported at its sides on suitable supporting tracks on the inner sides of the wagon and the lower stretch of the conveyer is supported at intervals to prevent the same from sagging by a series of supporting rollers which are mounted on cross bars arranged at intervals across the under side of the machine as shown.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention what I claim is:

The combination of a box, brackets depending from the box, traveling supports having axles journaled in said brackets, a conveyer forming the bottom of the box, a distributing cylinder at the rear end of the box, a driving shaft journaled in the sides of the box above the depending brackets, sprocket gearing connecting said driving shaft with the axles of the traveling supports, gearing connected with one end of the driving shaft to actuate the conveyer, gearing connected with the opposite end of the driving shaft to actuate the distributing cylinder, wedges slidably supported on the axles of the traveling supports and adapted to release the sprocket gearing therefrom, means supported by the depending brackets to hold the sprocket gearing normally locked to the axle, rods extending forwardly from said wedges, a rock shaft on the front end of the box, means for operating said rock shaft, and crank arms on said shaft connected to the front ends of said forwardly extending rods.

In testimony whereof I have hereunto set my hand in presence of two subscribing witnesses.

JOHN HARKER.

Witnesses:
   EARL DAVID PRAY,
   J. AUSTIN JONES.

---

Copies of this patent may be obtained for five cents each, by addressing the "Commissioner of Patents, Washington, D. C."